Patented Mar. 14, 1944

2,343,972

UNITED STATES PATENT OFFICE 2,343,972

NOVEL FURFURYL ALCOHOL-FORMALDEHYDE ACID CONDENSATION RESINOUS PRODUCT AND METHOD FOR PREPARING THE SAME

Mortimer T. Harvey, South Orange, N. J., assignor to Harvel Research Corporation, a corporation of New Jersey No Drawing. Application February 24, 1943, Serial No. 476,968

22 Claims. (Cl. 260—67)

The present invention relates to condensation products of furfuryl alcohol and formaldehyde and to methods and steps of making and using the same.

It is well known in the arts that resins can be made from furane compounds, for example, furfuryl alcohol can be polymerized with the aid of an acid to form resinous materials and, also, furfuraldehyde and formaldehyde can be condensed to form resinous products.

The reactions for products of furfuraldehyde-formaldehyde condensation products have the disadvantage of proceeding very slowly and inefficiently. That is, they produce but a small percentage of the reaction products under desirable conditions and under these they require comparatively large amount of catalysts.

I have discovered that furfuryl alcohol and formaldehyde can be caused to react to form condensation products with the aid of very small amounts of acids and to form resin-like materials which range in consistency from a thin liquid to heavy bodies all of which can be made to set to a final state which is hard, tough and horn-like in character. These reactions can be made to proceed at rates of speed which are suitable to desirable manufacturing conditions, and further, they can be controlled. These reactions have the further advantage that the product is formed without blow-holes whereby the reaction is suitable for making cast pieces and shapes as in molds or other containers or by flowing into sheets. This characteristic is also advantageous in impregnating sheets of fibrous material for making laminations and in making products which are molded under pressure with the use of fillers. That is, the products of the present invention are suitable as binders for asbestos, wood flour, slate dust, iron oxide, and other commercial fillers for molding products.

The products of the present invention are suitable both as binders and as fillers, either or both together, in brake linings and clutch facing for withstanding rapid changes in temperature and changes over wide ranges of temperature, and for withstanding high temperatures for prolonged periods of time.

The products of the present invention are suitable for use as binders for abrasive particles such as sand and carborundum in sand paper, grinding wheels and the like.

The products of the present invention are suitable for making coating materials, for chemical resistant paints, for electrical insulation and for general protection.

The products of the present invention are suitable also for incorporating with vinyl polymers and co-polymers such as products of vinyl acetate and vinyl chloride for raising the melting point of vinyl products, by copolymerization with said vinyl compounds.

The products of the present invention are suitable for use with other resins which are soluble in alcohols such as, for example, lignin resins and phenol-formaldehyde resins which are soluble in alcohol for the purpose of varying the characteristics of such resins.

The products of the present invention both in the primary state and intermediate state are soluble in furfuraldehyde and in alcohol such for example as methyl alcohol and ethyl alcohol. In the final heat-hardened state the products of the present invention are insoluble in water or any of the alcohols and are generally insoluble. In the primary state the products of the present invention are soluble in water. For example, when products of the present invention are made by refluxing furfuryl alcohol and formaldehyde or its polymers in contact with an acid catalyst, at or near the end of the refluxing period the reaction product is in a primary state in which it is hydrophilic. In the hydrophilic state the reaction product of the present invention is soluble in furfuraldehyde, in alcohols such as methyl alcohol and ethyl alcohol, for illustrative examples, and in other solvents. In the hydrophilic state the products of the present invention are suitable for use as a glue or adherent for securing veneer layers of wood to bases and for general lamination of wood and of other materials, the product being set by heat to change it from the primary or hydrophilic state, through an intermediate state, and to a final infusible, insoluble state.

The intermediate fusible reaction product of my present invention may be advantageously used in admixture with proteins to increase the water resistance and tensile strength of the protein. The proteins suitable for use may be casein, gelatin, glue, blood albumin and the like. For example, I have found that by adding 5% of the intermediate product of my invention to casein, the water resistance of the casein is greatly improved and when 5% of casein is added to the intermediate product of my present invention, the viscosity of my said product is increased. I have discovered that admixtures in intermediate proportions may be used under varying conditions.

The product of the present invention can be melted into rubber, reclaimed rubber and artificial rubber such as the Buna type and polychlor-isoprene rubber, for example, for the purpose of increasing the resistance to oils an increasing the life of rubber and artificial rubber.

Illustrative examples of catalysts suitable for use in the condensation of furfuryl alcohol and formaldehyde according to the present invention are lactic acid, formic acid, acetic acid, sulphuric acid, hydrochloric acid and phosphoric acid. The mole ratio of the quantity of furfuryl alcohol to the quantity of formaldehyde may be between about 1 to ½ and 1 to 3. Generally stated, the optimum conditions for catalysts is an acid condition of the reactive mixture of furfuryl alcohol and formaldehyde of values of from 3 to 3.5 pH and acid values as high as 1.5 pH may be used for a more rapid reaction. Under the more rapid reaction conditions, it is necessary to wash out the excess acidity in the intermediate product or to add alkali to adjust the acidity of the product to approximately 3.5 pH. Conveniently, the acidity may be further reduced to the alkaline side as far as a pH value of 14. The product of my invention thus treated may be stored for extended periods without increasing appreciably in viscosity. Stated another way, catalyzing agents suitable for the practice of the present invention may be described as those which produce a hydrogen ion concentration in the reaction mixture comparable to that obtained by the use of lactic acid and more specifically as used in the illustrative examples given herein.

Following are given illustrative examples of methods of practicing the present invention.

*Example 1.*—One mole of furfuryl alcohol and one mole of formaldehyde.

One hundred fifty pounds of furfuryl alcohol, about one hundred twenty pounds of commercial 37½ per cent solution of formaldehyde in water and about seven pounds and three ounces of a commercial 50 per cent solution of lactic acid in water were placed together in a kettle having a steam-jacket, a reflux condenser and an agitator. The reflux condenser is arranged at an angle and provided with valves to take off the distillate when a dehydration stage is reached. Steam at ninety pounds pressure was turned on to the steam jacket and after about three hours the temperature of the reaction mixture had reached about 95° C. and refluxing had begun. The temperature was maintained at about 95° C. for a further period of about one and one-half hours during which refluxing continued and after this time the condenser valves were changed to pass off the condensed distillate which was chiefly water. A stopping place for the refluxing can be taken at the point where a small proportion of water commences to separate from the reaction mass. It is noted that this distillation or dehydration was conducted at atmospheric pressure. The distillation was discontinued when the reaction product reached the consistency of molasses and at this point the water had not been completely removed, the residue from the distillation being about 85% solids and about 15% water. This product is suitable among other things for making molded brake linings, for example.

If casting resin to make parts free of blowholes is desired, the dehydration, or the final part of it, is carried on under reduced pressure whereby substantially all of the water is distilled off before the viscosity of the reaction product has passed a predetermined point favorable to use for resin casting purposes.

If a hydrophilic resin or a water solution of the resin is desired the heating must be discontinued before the refluxing period has carried the reagents to the condensation stage where a small sample of the reaction mixture will throw the reaction product out of solution when placed in a large quantity of water.

The commercial 37½% formaldehyde solution described above contains about 8% to 10% of methyl alcohol and the dilute solution of methyl alcohol in water is advantageous in the dissolving of the hydrophilic reaction product of the present invention. This product is suitable as a glue or adherent for making veneers and laminations and in other places where a water soluble glue is desired which, after application, can be set by heat to an insoluble state.

Hereinafter, unless otherwise noted, the commercial formaldehyde solution used is that described above in Example 1.

*Example 2.*—One mole of furfuryl alcohol and about one and one-half mole of formaldehyde.

About two hundred grams of furfuryl alcohol, three hundred and twenty grams of commercial fomaldehyde solution and about six grams of lactic acid (80% solution) were heated together under a reflux condenser for about one and three-quarters hours after which the reaction product was dehydrated under vacuum. The dehydration distillate weighed 216 grams and the residue weighed 294 grams. The fusible intermediate resin was soluble in alcohol and acetone. After subtracting five grams for the lactic acid, the remaining 289 grams of resin indicates that substantially three gram molecular weight equivalents of formaldehyde have condensed with two gram molecular weights of furfuryl alcohol.

*Example 3.*—One mole of furfuryl alcohol and about two-thirds mole of formaldehyde.

About five hundred grams furfuryl alcohol, four hundred grams commercial formaldehyde solution and about twenty grams lactic acid (80%) were refluxed for about two hours. After this, dehydration was carried on under vacuum from which 308 grams of aqueous distillate (specific gravity 1.01) and 596 grams of residue were obtained. The fusible intermediate resin was soluble in alcohol and acetone. After deducting 16 grams for lactic acid, the remaining 80 grams increase in weight of the reaction product over the weight of the reagents indicated that substantially two-thirds mole of formaldehyde had reacted with one mole of furfuryl alcohol to form a reaction product.

*Example 4.*—Five hundred grams of furfuryl alcohol, about two hundred grams of commercial formaldehyde solution and about twenty grams of lactic acid were refluxed for about two hours and then dehydrated under vacuum. The reaction product was soluble in alcohol and acetone.

*Example 5.*—About one hundred grams of furfuryl alcohol, one hundred sixty grams of commercial formaldehyde solution and four grams of formic acid (90%) were heated together under reflux condenser about two hours after which the reaction mass was dehydrated at atmospheric pressure. The reaction product, a resin, became very thick before dehydration was completed. It was soluble in alcohol and acetone.

*Example 6.*—One mole of furfuryl alcohol condensed with two moles of formaldehyde.

One hundred grams of furfuryl alcohol and two hundred forty grams of commercial formaldehyde solution, together with three grams of lactic acid (80%), were heated under a reflux condenser and at refluxing temperature for two and one-half hours, that is, until a slight separation of an aqueous layer appeared, after which the reaction mass was dehydrated under vacuum. The distillate was 166 grams and the residue, which was a thermosetting resinous liquid, was 164 grams. It was soluble in alcohol and acetone. After the deduction for lactic acid, the weight of this said resinous liquid indicated that about two molecular equivalents of formaldehyde had condensed with one molecular equivalent of furfuryl alcohol to form said resinous liquid.

*Example 7.*—Two hundred grams of furfuryl alcohol and one hundred sixty grams of formaldehyde together with 2.0 cubic centimeters of dilute hydrochloric acid (made by diluting 10 cc. of concentrated hydrochloric acid to 100 cc.) were heated together under a reflux condenser to refluxing temperature for about two hours, that is, until a slight aqueous separation appeared. After this the reaction mass was dehydrated under vacuum. The residue was a thermosetting resinous liquid, soluble in alcohol and acetone and its weight was 221 grams. This weight indicated that about one-third of a molecular weight proportion of formaldehyde had condensed with each molecular weight proportion of furfuryl alcohol.

In the condensation of furfuryl alcohol and formaldehyde according to the present invention, the appearance of a slight aqueous layer can be taken as a stopping point for some purposes, although the heating can be discontinued before that as in the case of using the resin in the hydrophilic state, and the heating can be carried on beyond the appearance of the aqueous separation, for some purposes.

*Example 8.*—Ninety-eight grams of furfuryl alcohol and ninety grams of paraformaldehyde together with four grams of lactic acid (80%) were heated together under reflux condenser at refluxing temperature, approximately 110° C. for about two hours. After this, the reaction mass was dehydrated under vacuum, the residue was a thermosetting resinous liquid and its weight was one hundred fifty grams. It was soluble in alcohol and acetone.

*Example 9.*—Ninety-eight grams of furfuryl alcohol and thirty grams of paraformaldehyde together with one gram of chloracetic acid were heated together under a reflux condenser at refluxing temperature, approximately 110° C. for about one hour. After this, the reaction mass was dehydrated under vacuum, the residue was a thermosetting resinous liquid and its weight was one hundred eighteen grams. It was soluble in alcohol and acetone.

*Example 10.*—Ninety-eight grams of furfuryl alcohol and fifteen grams of paraformaldehyde together with four grams of lactic acid (80%) were heated together under reflux condenser at refluxing temperature, approximately 110° C. for about one hour. After this, the reaction mass was dehydrated under vacuum, the residue was a thermosetting resinous liquid and its weight was one hundred two grams. It was soluble in alcohol and acetone.

*Example 11.*—Ninety-eight grams of furfuryl alcohol and thirty grams of paraformaldehyde together with four grams of lactic acid (80%) were heated together under reflux condenser at refluxing temperature, approximately 110° C. for one and one-half hours. After this, the reaction mass was dehydrated under vacuum; the residue was a thermosetting resinous liquid and its weight was one hundred sixteen grams. It was soluble in alcohol and acetone.

*Example 12.*—Ninety-eight grams of furfuryl alcohol and sixty grams of paraformaldehyde together with four grams of lactic acid (80%) were heated together under reflux condenser at refluxing temperature, approximately at 110° C., for about one and one-half hours. After this, the reaction mass was dehydrated under vacuum; the residue was a thermosetting resinous liquid and its weight was one hundred thirty-seven grams. It was soluble in alcohol and acetone and insoluble after curing.

I have discovered that conditions as to the presence or absence of water in the reaction mixture are not critical. The reaction of my invention may be carried out with equal certainty and facility whether they be anhydrous or whether they be hydrous to the degree in Examples 1 to 7 inclusive, as illustrative examples only. As an illustrative example of strictly anhydrous conditions I have set forth below Example 13.

*Example 13.*—Furfuryl alcohol was dehydrated by heating under vacuum of 20 mm. pressure and up to the temperature of the boiling point of furfuryl alcohol. Paraformaldehyde was placed in a distilling flask and heated on a water bath under vacuum of 20 mm. pressure, and at the same temperature to which the furfuryl alcohol had been raised. Lactic acid (80%) was dehydrated under vacuum and heated to obtain an anhydrous lactic acid. Two hundred grams of the above dehydrated furfuryl alcohol, sixty grams of dehydrated paraformaldehyde and ten grams of concentrated anhydrous lactic acid were mixed and heated under a reflux condenser for two hours at a temperature of approximately 110° C. After the reaction, the mixture was dehydrated under approximately 10 mm. vacuum. The residue was a thermosetting resinous liquid and its weight was two hundred fifty grams. It was soluble in alcohol and acetone while after curing it was insoluble.

I have also discovered that the reaction of my invention is not restricted as to the form of the catalyzing agent to the use of acids. As illustrated in examples herein stated, I have used alkyl sulfates and acid salts in the modifying of the acid conditions of the mixture for the purposes of catalysis.

*Example 14.*—Ninety-eight grams of furfuryl alcohol, eighty-five grams of formaldehyde and two grams of diethyl sulfate were refluxed together under a reflux condenser at approximately 100° C. until a separation of water occurred. The mass was cooled rapidly to produce a viscous fusible thermosetting resin. This product may be used for friction materials or for fillers for hard rubber and other molding products.

*Example 15.*—Ninety-eight grams of furfuryl alcohol, eighty-five grams of formaldehyde and thirty grams of primary sodium acid phosphate were refluxed approximately three hours at 95° C. The salt of the mixture and some of the water formed a separate layer at the bottom and was removed with a separatory funnel. The water-soluble resin at the top was dehydrated and proved to contain 50% of a heat-reactive resin capable of being, by further heat, converted into a hard infusible mass.

*Example 16.*—One hundred grams of furfuryl alcohol, twenty-four grams of hexamethylene tetramine were mixed together and lactic acid (80%) was slowly added until the mixture became just slightly acetic. This mixture was refluxed for about two hours at approximately 110° C. The reacted mass was dehydrated under vacuum leaving a residue which proved to be a thermosetting resinous liquid of the present invention.

While I have found it convenient to carry on the reaction of my invention as in the illustrative examples hereinabove set forth at temperatures nearly that of the boiling point of water, I have also discovered that the reactions of my invention may be carried on at different temperatures with equal certainty. As illustrative example I state below as Example 17 how the reaction of my invention may be carried on at temperatures below 100° C.

*Example 17.*—Ninety-eight grams of furfuryl alcohol, eighty-five grams of formaldehyde (approximately 37½% water solution) together with four grams of lactic acid (80%) were placed in a closed container and held at a temperature of 65° C. for a total of fifty-two hours. At the end of twenty-three hours examination disclosed that the reaction had proceeded to an intermediate stage wherein the reaction product was fusible, soluble in alcohol and acetone, and capable of being reacted further. It was further reacted by continuing the maintainance of the temperature at 65° C. for the balance of the fifty-two hours. Upon the completion of this reaction after fifty-two hours, the resulting reaction product changed to a tough, rubbery mass soluble in acetone. It was suitable for melting with fillers and such other addition agents on differential rolls, for instance, and was capable of curing to a final hard, infusible form at approximately 330° F. at 2500 lbs. pressure per sq. in.

I have also discovered that the reaction of my invention may be carried on at temperatures far in excess of 100° C. by enclosing the ingredients in an autoclave for instance, so that none of the components of the reacted mass shall be lost by evaporation. The speed of the reaction is greater at the higher temperatures and slower at the lower temperatures.

Having thus described my invention, what I claim and desire to protect by Letters Patent is:

1. The method for producing a fusible resin comprising heating until said resin is produced a mixture whose pH is between about 1.5 and about 3.5 and comprising furfuryl alcohol, formaldehyde and an acidic agent in such amount as to provide said pH.

2. The method for producing a fusible resin comprising heating until said resin is produced a mixture whose pH is between about 1.5 and about 3.5 and comprising furfuryl alcohol, formaldehyde and an acidic agent in such amount to provide said pH, the mole ratio of furfuryl alcohol to formaldehyde in said mixture being between about 1 to ½ and 1 to 3.

3. The method for producing a fusible resin comprising heating until said product is produced a mixture whose pH is between about 3 and about 3.5 and comprising furfuryl alcohol, formaldehyde and an acidic agent in such amount as to provide said pH.

4. The method for producing a fusible resin comprising heating until said resin is produced a mixture whose pH is between about 3 and about 3.5 and comprising furfuryl alcohol, formaldehyde and an acidic agent in such amount as to provide said pH, the mole ratio of furfuryl alcohol to formaldehyde in said mixture being between 1 to ½ and 1 to 3.

5. The method for producing a fusible resin comprising heating until said resin is produced a mixture whose pH is between about 1.5 and about 3.5 and comprising furfuryl alcohol, formaldehyde and lactic acid in such amount to provide said pH.

6. The method for producing a fusible resin comprising heating until said resin is produced a mixture whose pH is between about 3 and about 3.5 and comprising furfuryl alcohol, formaldehyde and lactic acid in such amount to provide said pH.

7. The method for producing a fusible resin comprising heating until said resin is produced a mixture whose pH is between about 1.5 and about 3.5 and comprising furfuryl alcohol, formaldehyde and hydroxy acetic acid in such amount to provide said pH.

8. The method for producing a fusible resin comprising heating until said resin is produced a mixture whose pH is between about 3 and about 3.5 and comprising furfuryl alcohol, formaldehyde and hydroxy acetic acid in such amount to provide said pH.

9. The method for producing a fusible resin comprising heating until said resin is produced a mixture whose pH is between about 1.5 and about 3.5 and comprising furfuryl alcohol, formaldehyde and lactic acid in such amount to provide said pH, the mole ratio of the quantity of furfuryl alcohol to the quantity of formaldehyde in said mixture being between about 1 to ½ and 1 to 3.

10. The method for producing a fusible resin comprising heating until said resin is produced a mixture whose pH is between about 3 and about 3.5 and comprising furfuryl alcohol, formaldehyde and lactic acid in such amount to provide said pH, the mole ratio of the quantity of furfuryl alcohol to the quantity of formaldehyde in said mixture being between about 1 to ½ and 1 to 3.

11. The method for producing a fusible resin comprising heating until said resin is produced a mixture whose pH is between about 1.5 and about 3.5 and comprising furfuryl alcohol, formaldehyde and hydroxy acetic acid in such amount to provide said pH, the mole ratio of the quantity of furfuryl alcohol to the quantity of formaldehyde in said mixture being between about 1 to ½ and 1 to 3.

12. The method for producing a fusible resin comprising heating until said resin is produced a mixture whose pH is between about 3 and about 3.5 and comprising furfuryl alcohol, formaldehyde and hydroxy acetic acid in such amount to provide said pH, the mole ratio of the quantity of furfuryl alcohol to the quantity of formaldehyde in said mixture being between about 1 to ½ and 1 to 3.

13. The method comprising heating until a fusible resin is produced a mixture whose pH is between about 1.5 and about 3.5 and comprising furfuryl alcohol, formaldehyde and an acidic agent in such amount as to provide said pH and then increasing the pH of said resin.

14. The method comprising heating until a fusible resin is produced a mixture whose pH is between about 3 and 3.5 and comprising furfuryl alcohol, formaldehyde and an acidic agent in such amount as to provide said pH and then increasing the pH of said resin.

15. The method comprising heating until a fusible resin is produced an acidic mixture whose pH is between about 1.5 and 3.5 and comprising furfuryl alcohol, formaldehyde and an acidic agent in such amount as to provide said pH and then increasing above about 3.5 the pH of said resin.

16. The method comprising heating until a fusible resin is produced an acidic mixture whose pH is between about 1.5 and about 3.5 and comprising furfuryl alcohol, formaldehyde and an acidic agent in such amount to provide said pH and then increasing the pH of said resin, the mole ratio of the furfuryl alcohol to the formaldehyde in said mixture being between about 1 to ½ and about 1 to 3.

17. The method for producing a fusible resin comprising heating at approximately refluxing temperature until said product is produced a mixture whose pH is between about 3 and about 3.5 and comprising furfuryl alcohol, formaldehyde and an acidic agent in such amount as to provide said pH.

18. The method for producing a fusible resin comprising heating at approximately refluxing temperature until said resin is produced a mixture whose pH is between about 3 and about 3.5 and comprising furfuryl alcohol, formaldehyde and an acidic agent in such amount as to provide said pH, the mole ratio of furfuryl alcohol to formaldehyde in said mixture being between 1 to ½ and 1 to 3.

19. The resinous product obtained by method of claim 1.

20. The resinous product obtained by method of claim 3.

21. The resinous product obtained by method of claim 15.

22. The resinous product obtained by method of claim 16.

MORTIMER T. HARVEY.